UNITED STATES PATENT OFFICE 2,159,399

STABILIZATION OF CELLULOSE ETHERS

Floyd C. Peterson, Syracuse, N. Y., and Howard N. Fenn, Midland, Mich., assignors to The Dow Chemical Company, Midland, Mich., a corporation of Michigan No Drawing. Application December 9, 1937, Serial No. 178,885

4 Claims. (Cl. 260—232)

This invention relates to a method whereby cellulose ethers may be made resistant to such oxidation and embrittlement as usually result when such ethers are heated to temperatures above their softening point.

Cellulose ethers have been available for some time which resist thermal decomposition at temperatures up to about 120° C. even when such temperatures are maintained for from 12 to 24 hours, or longer. One method of expressing the stability is in terms of the per cent of the original viscosity of a cellulose ether which is retained when a film thereof is subjected to a temperature of 120° C. for 16 hours. When high stability is indicated by this test, the cellulose ether is generally satisfactory for films or foils where flexibility is a prime requisite and where the product will not be subjected to more strenuous conditions of temperature. Cellulose ethers which are to be molded at temperatures above their softening point must possess greater stability than can be measured in the 120°-16 hour test. At present, most of the commercially available cellulose ethers which meet the requirements of the 120° test are found to be subject to oxidation, discoloration, and embrittlement after exposure to temperatures above the softening point of such materials, i. e. in the range from about 130° to about 200° C. The importance of cellulose ether compositions in the preparation of molding plastics is of increasing importance. It is necessary therefore to provide cellulose ethers which will not be discolored as a result of the molding operation or which will not show other effects of high temperatures, such as embrittlement, after the molding operation has been performed.

It is, accordingly, among the objects of the invention to provide a process whereby cellulose ethers may be stabilized to such an extent that they may be satisfactorily employed in molding operations, and the like, at temperatures above their softening point, i. e. ordinarily in the range from 130° to 200° C. and more particularly from 150° to 180° C.

It is a further object of the invention to provide a cellulose ether which is resistant to thermal oxidation and to embrittlement resulting from such oxidation.

We have now found that the foregoing objects may readily be attained by treating a crude cellulose ether in a slightly alkaline aqueous suspension thereof with a solution of formaldehyde wherein the formaldehyde is present in amounts from about 15 to about 40%, and preferably from 22 to 28%, of the weight of cellulose ether being treated. During the course of treatment the formaldehyde reduces certain impurities in the crude cellulose ether and is itself oxidized to formic acid. For this reason we prefer to operate in an initially alkaline medium, which, however, contains insufficient alkali to neutralize completely the formic acid produced by oxidation of the formaldehyde employed, but which is sufficient to neutralize a portion of the formic acid and thus minimize any degradation of the cellulose derivative due to the action of such acid. We have found that satisfactory results are obtained if the reaction medium has an initial pH in the range from about 8 to 11. Formic acid produced during the reaction is converted to formates which may be washed from the product after the aldehyde treatment. The temperature of reaction is preferably in the range from 100° to 170° C. and more particularly in the range from 155° to 160° C. Such temperatures of operation require that the process be carried out in a closed system and the usual pressure corresponding to such temperature is about 60 to 100 pounds per square inch. Exposure of the cellulose ether to the action of formaldehyde for a period of about two hours has been found sufficient to accomplish the desired result.

The following example illustrates the practice of our invention:

Example 145 grams of an ethyl cellulose having a viscosity of 91 centipoises, when measured on a 5% solution thereof, by weight, in a mixture of 80 parts of toluene and 20 parts of ethanol, by volume, and which had a stability of 19% when heated to 170° C. exposed to air for 50 minutes, was suspended in 8 pounds of water and treated with 96 grams of reagent quality formaldehyde of 37% concentration. The amount of formaldehyde present corresponded to 24.5% of the weight of ethyl cellulose being treated. The solution was made slightly alkaline by the addition of 3 grams of reagent quality sodium hydroxide. The pH of the suspension was 8.2. The mixture was placed in a nickel-lined pressure vessel and was heated to 155° C. as rapidly as possible. It was thereafter held at this temperature for two hours, then cooled to room temperature, and the reactor content removed. The pH of the slurry at this point was 2.4. The ethyl cellulose was filtered from the aqueous solution, washed with further amounts of pure water and dried. The viscosity of the so treated material, when determined in the manner previously described, was 86 centipoises, and the stability of a sample thereof, after being heated to 170° C. for 50 minutes, was 100%. The material obtained had a slight coloration which was readily removed by bleaching the material with an alkaline hypochlorite solution containing chlorine in an amount equivalent to 4% of the weight of ethyl cellulose. The bleach was carried out in alcoholic solution over a period of 30 minutes at room temperature. The ethyl cellulose was then precipitated from solution by addition of large quantities of water, was washed until the wash water showed no further traces of chlorides, and dried. A white product was obtained having a viscosity of approximately 90 centipoises and which was 90% stable when subjected to the 170°-50 minute test.

The process has been illustrated with reference to ethyl cellulose but is also applicable to the corresponding treatment of other cellulose ethers such as the lower alkyl cellulose ethers, including methyl cellulose, propyl cellulose and the like, and the aralkyl ethers of cellulose such as benzyl cellulose.

The herein described treatment may be employed advantageously in the preparation of cellulose ethers which will be stable to temperatures employed in injection molding operations, and the like, and provides a product which is resistant to discoloration during such high temperature operations. Another advantage of the operation resides in its simplicity, i. e. ease of handling the material, availability of reagents, moderate temperatures and pressures required, etc.

The cellulose ethers isolated from a treatment of the type herein described have been found to possess better color characteristics when the formaldehyde employed is of reagent quality than when a technical grade of formaldehyde is employed. It is not essential, however, to use a pure formaldehyde, especially if the ether is to be pigmented or otherwise colored prior to molding or other high temperature operations.

Other modes of applying the principle of our invention may be employed instead of those explained, change being made as regards the process herein disclosed, provided the step or steps stated by any of the following claims or the equivalent of such stated step or steps be employed.

We therefore particularly point out and distinctly claim as our invention:

1. The process which comprises treating a slightly alkaline aqueous suspension of a cellulose ether with an amount of formaldehyde equal to between 15 and 40 per cent of the weight of the cellulose ether, and heating the mixture in a closed vessel at a temperature between 100° and about 170° C., to produce a cellulose ether of improved thermostability.

2. The process which comprises treating an aqueous suspension of a cellulose ether with an amount of formaldehyde equal to between about 15 and about 40 per cent by weight of the cellulose ether being treated, and an amount of alkali sufficient to produce in the aqueous medium a pH between about 8 and 11, said alkali being, however, insufficient in quantity to neutralize completely the acids produced during the process, and heating the mixture in a closed vessel at a temperature between about 100° and about 170° C. for from ½ to 3 hours.

3. The process which comprises treating an aqueous suspension of ethyl cellulose with an amount of formaldehyde equal to between about 15 and about 40 per cent by weight of the ethyl cellulose being treated, and an amount of alkali sufficient to produce in the aqueous medium a pH between about 8 and 11, said alkali being, however, insufficient in quantity to neutralize completely the acids produced during the process, and heating the mixture in a closed vessel at a temperature between about 100° and about 170° C. for from ½ to 3 hours.

4. The process which comprises treating an aqueous suspension of ethyl cellulose with an amount of formaldehyde equal to between about 22 and about 28 per cent by weight of the ethyl cellulose being treated, and an amount of alkali sufficient to produce in the aqueous medium a pH between about 8 and 11, said alkali being, however, insufficient in quantity to neutralize completely the acids produced during the process, and heating the mixture in a closed vessel at a temperature between about 155°–160° C. for from ½ to 3 hours.

FLOYD C. PETERSON.
HOWARD N. FENN.